US009203209B2

(12) United States Patent
Ramachandran (10) Patent No.: US 9,203,209 B2
(45) Date of Patent: Dec. 1, 2015

(54) HIGH-POWER FIBER LASER EMPLOYING NONLINEAR WAVE MIXING WITH HIGHER-ORDER MODES

(71) Applicant: Trustees of Boston University, Boston, MA (US)

(72) Inventor: Siddharth Ramachandran, Boston, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 14/529,637

(22) Filed: Oct. 31, 2014

(65) Prior Publication Data

US 2015/0188283 A1   Jul. 2, 2015

Related U.S. Application Data

(63) Continuation of application No. PCT/US2013/039647, filed on May 6, 2013.

(60) Provisional application No. 61/643,266, filed on May 5, 2012.

(51) Int. Cl.
| | |
|---|---|
| *G02F 1/35* | (2006.01) |
| *H01S 3/30* | (2006.01) |
| *G02B 6/02* | (2006.01) |
| *H01S 3/108* | (2006.01) |
| *H01S 3/00* | (2006.01) |
| *H01S 3/067* | (2006.01) |

(Continued)

(52) U.S. Cl.
CPC .............. *H01S 3/108* (2013.01); *H01S 3/0092* (2013.01); *H01S 3/06708* (2013.01); *H01S 3/06725* (2013.01); *G02B 6/02023* (2013.01); *G02F 1/3536* (2013.01); *H01S 3/1618* (2013.01); *H01S 3/2391* (2013.01)

(58) Field of Classification Search
None
See application file for complete search history.

(56) References Cited

U.S. PATENT DOCUMENTS

| 5,574,818 A | 11/1996 | Krivoshlykov |
| 6,909,729 B2 | 6/2005 | Ibanescu et al. |

(Continued)

FOREIGN PATENT DOCUMENTS

JP    20020094155 A    3/2002

OTHER PUBLICATIONS

D.Nodop, et al., "Efficient High-Power Generation of Visible and Mid-Infrared Light by Degenerate Four-Wave-Mixing in a Large-Mode-Area Photonic-Crystal Fiber", vol. 34, No. 22, Optics Letters, Nov. 15, 2009, pp. 3499-3501.

(Continued)

*Primary Examiner* — Hemang Sanghavi
(74) *Attorney, Agent, or Firm* — BainwoodHuang (57) ABSTRACT

A high-power fiber laser exploits efficiency and wavelength-conversion of nonlinear wave mixing in a higher-order mode (HOM) fiber providing large effective area and higher-power operation than single-order mode (SMF) fiber. In a "monomode" approach, mixing waves (pump(s), signal, idler) propagate in the same higher-order mode, and in an "intermodal" approach different waves propagate in different modes. The monomode approach can provide high-power wavelength conversion generating output in a desired band where good dopants may be unavailable. The intermodal approach demonstrates coherent combining of outputs of multiple lasers to generate high-power output in a desired band.

20 Claims, 7 Drawing Sheets

(51) Int. Cl.
*H01S 3/16* (2006.01)
*H01S 3/23* (2006.01)

(56) References Cited

U.S. PATENT DOCUMENTS

| | | |
|---|---|---|
| 7,228,029 B1 | 6/2007 | Ramachandran et al. |
| 7,925,128 B2 | 4/2011 | Ramachandran |
| 8,126,299 B2 | 2/2012 | Ramachandran |
| 2007/0206910 A1 | 9/2007 | Ramachandran |
| 2010/0046067 A1 | 2/2010 | Fermann et al. |
| 2010/0166025 A1 | 7/2010 | Grapov et al. |
| 2014/0002890 A1* | 1/2014 | Jauregui Misas et al. .... 359/326 |
| 2015/0009554 A1* | 1/2015 | Gruner-Nielsen et al. ... 359/326 |

OTHER PUBLICATIONS

R. Jiang, et al., "Parametric Wavelength Conversion From Conventional Near-Infrared to Visible Band", vol. 18, No. 23, IEEE Photonics Technology Letters, Dec. 1, 2006, pp. 2445-2447.

Siddharth Ramachandran, "Fibers for Fiber Lasers: Higher-Order Mode Propagation May Enable Power Scaling", Laser Focus World, May 1, 2007, pp. 1-9.

\* cited by examiner

HIGH-POWER FIBER LASER EMPLOYING NONLINEAR WAVE MIXING WITH HIGHER-ORDER MODES

STATEMENT OF GOVERNMENT RIGHTS

The invention was made with US Government support under Contract Nos. N00014-11-1-0133 and N0014-11-1-0098 awarded by the Office of Naval Research. The Government has certain rights in the invention.

BACKGROUND

The invention is related to the field of fiber lasers.

A fiber laser is a laser device employing an optical fiber as an optical gain medium and waveguide in which a laser optical signal is developed. The optical fiber may be formed of a doped silica glass, for example, and it is typically "pumped" with a separate light source such as an array of light-emitting diodes or a separate laser. The pump energy is transformed into the laser optical signal in accordance with known laser operating principles.

SUMMARY

A high-power fiber laser exploits the efficiency and wavelength-conversion aspects of nonlinear wave mixing in a higher-order mode (HOM) fiber providing large effective area and therefore higher-power operation than traditional single mode fiber (SMF). Two basic approaches are shown, a "monomode" approach in which the mixing waves (pump(s), signal, idler) propagate in the same higher-order mode, and an "intermodal" approach in which different waves propagate in different modes. Specific examples of each approach are shown. In one embodiment, the monomode approach provides high-power wavelength conversion generating output in a blue-green region using a commonly available near-infrared laser and a telecom-band (15xx nm) laser. In another embodiment, the intermodal approach demonstrates coherent combining of outputs of multiple near-IR lasers to generate high-power output in the blue-green region.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

The entirety of U.S. provisional patent application 61/643,266 filed May 5, 2012 is incorporated by reference herein.

While fiber lasers have made tremendous progress in power scaling at certain wavelengths, such as in the 1- and 2-um wavelength ranges, power scaling in other technologically attractive spectral ranges, such as UV, blue-green, eye-safe ranges, or the mid-IR, has been limited because suitable dopants are not readily available. Wavelength conversion via nonlinear wave mixing (e.g., four-wave mixing or FWM) in fibers is an attractive means of accessing these spectral ranges.

Here, a new path is proposed for exploiting fiber nonlinearities without being constrained by mode area and thus power-level limitations. This is based on the realization that the zero-dispersion wavelength (ZDW) in higher order modes (HOM) of fibers scales with mode order in analogy to ZDW scaling with mode area in photonic crystal fibers (PCFs). Moreover, since FWM requires that phase matching be achieved between the four interacting waves, and the ZDW requirement is only a result of applying this constraint in monomode fibers, it follows that the use of multiple modes to achieve this nonlinear interaction relaxes the ZDW constraint, opening up the design space of fibers even further. This, combined with the experimentally-proven fact that HOMs are more stable than the fundamental mode of suitably designed large mode area fibers, enables the development of fibers that can yield wavelength conversions at dramatically higher power levels.

A characteristic of HOM fibers is their ability to support any of a large number of modes of propagation with only a small variation of Aeff, signifying an ability for higher-power operation than can be achieved using SMF fibers with their significantly smaller Aeff values. A HOM fiber exhibits a mode-dependent dispersion characteristic. In a monomode approach, a high-power pump wave is used whose wavelength is near the zero-dispersion wavelength (ZDW) for a desired higher-order mode. Most of the energy of the pump is transferred to a signal wave of the same higher-order mode but having a wavelength shifted from that of the pump wave. This process is most efficient when the ZDW is within 50 nm of the pump wavelength. Multiple HOM fibers having different characteristics can be cascaded in order to place the output wave at a desired wavelength, such as UV, the blue-green or mid-IR regions for example.

In an intermodal approach, multiple pump waves at the same or slightly different wavelengths propagate in different higher-order modes and are combined coherently to generate a single higher-power signal wave at one of the modes. Different HOMs can again be cascaded for desired wavelength shifting.

Figure 1:
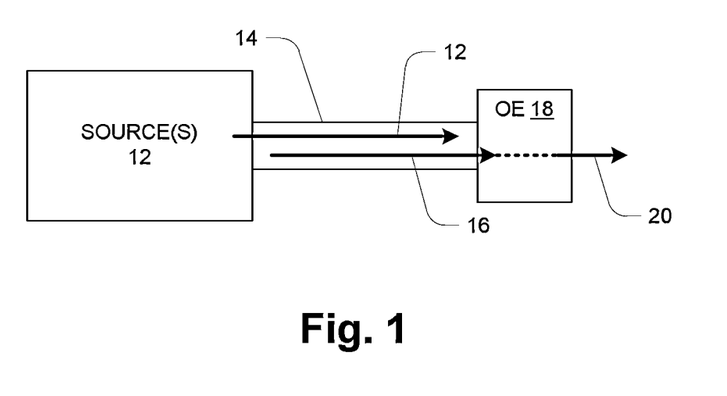
FIG. 1 is a schematic block diagram of a high-power fiber laser.

FIG. 1 is a simplified schematic depiction of a fiber laser. It includes one or more sources 10 of optical signal(s) 12 that are launched into a length of higher-order-mode (HOM) fiber 14. Within the HOM fiber 14 the optical signal(s) 12 are converted to one or more output optical signals 16 which are coupled out of the HOM fiber 14 by some type of optical element (OE) 18, examples of which are provided below. As the optical signals 16 pass through the OE 18 to form output optical signals 20, there may be a mode conversion, beam shaping, or other optical transformation as may be desired for system purposes.

Figure 2:
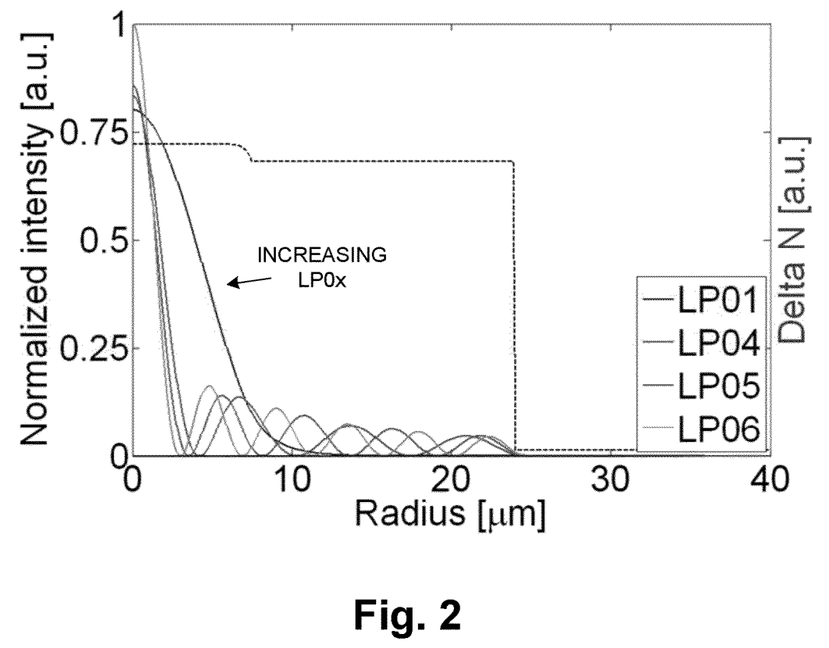
FIG. 2 is a diagram showing cross-sectional index profile and mode profile for a higher-order-mode (HOM) fiber.
Figure 3:
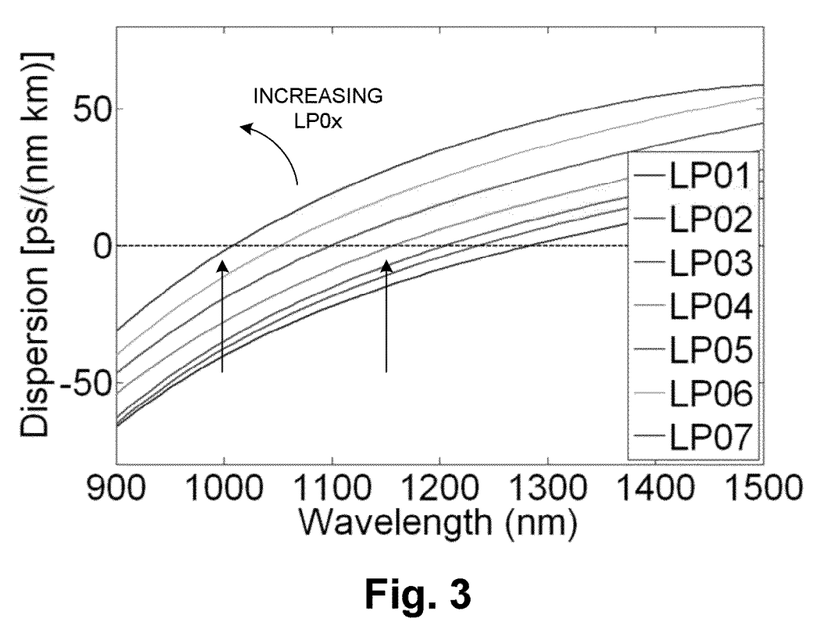
FIG. 3 is a plot of dispersion versus wavelength for a set of modes of a HOM fiber.
Figure 4:
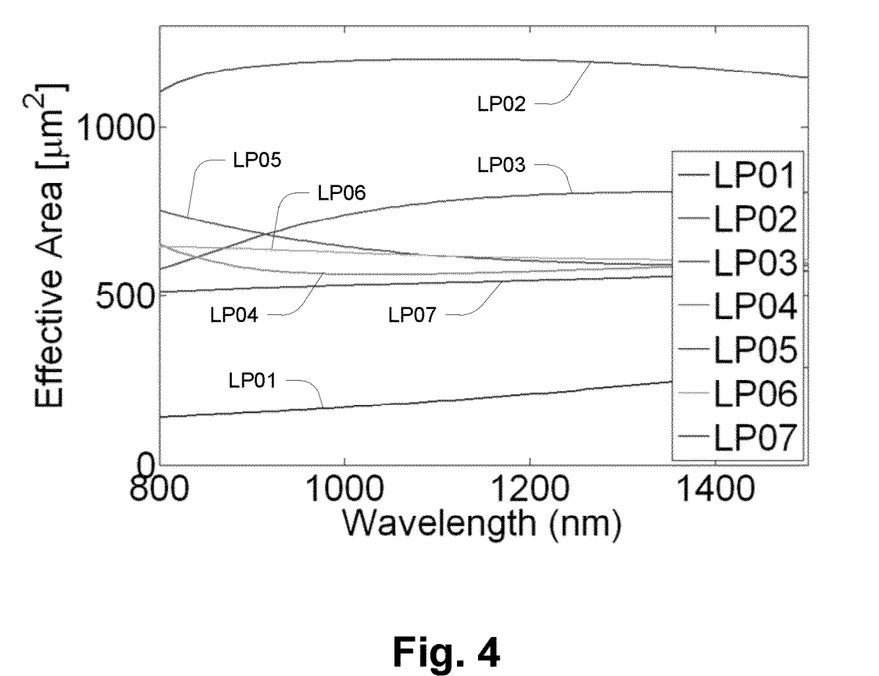
FIG. 4 is a plot of effective cross-sectional area versus wavelength for a set of modes of a HOM fiber.

FIGS. 2-4 show example index profile and modes, dispersion curves, and effective areas curves for different propagation modes. In this description, the propagation modes identified as LP0x are described, which exhibit Linear Polarization and azimuthal index I=0 (circularly symmetric). X is an integer having increasing value for increasing mode order, corresponding to successive patterns of cross-sectional wavefront shapes as known in the art. In this context, modes having lower X values are lower-order modes, and modes having higher X values are higher-order modes. Generally, references herein to "higher-order modes" refer to modes for which X is greater than 3. A practical range for higher-order modes of interest is LP04 through LP08. Other modes of interest have the same radial index X, but an azimuthal index I=1 or 2.

Referring to FIG. 2, this plot shows optical signal intensity versus radial distance from the optical axis (the center of a circular fiber) for various modes, as well as an "index profile" (dashed line) which is the value of the refractive index n of the fiber versus radial distance from the optical axis. As indicated, successively higher modes have narrower central lobes and more cycles per unit radial distance. The index profile has two transitions, a relatively small step at about 9 um and a larger steep step at about 24 um. These locations correspond to the radii of the core and inner cladding, respectively. Thus, the fiber is a so-called "doubly clad" fiber having an inner cladding of radius 24 um and a surrounding outer cladding of radius about 62.5 um (the radial extent of this plot is truncated at about 35 um).

FIG. 3 shows curves for dispersion-versus-wavelength for the LP01 through LP07 modes. Of interest is the point at which a curve crosses the zero-dispersion line, referred to as the "zero dispersion wavelength" or ZDW. As shown, the ZDW decreases with increasing mode order. For example as indicated, the ZDW for LP07 is about 1000 nm, while the ZDW for LP04 is about 1160 nm.

FIG. 4 shows so-called "effective area" or Aeff as a function of wavelength for the same set of modes. Although different modes have different Aeff values as shown, for each mode the Aeff value varies only slightly (e.g., by 10% or less) across the wavelength range of interest. This is one of the characteristics enabling the HOM fiber 14 to support efficient nonlinear mixing of higher-order modes.

A fiber laser as disclosed herein exploits a process known as "nonlinear wave mixing" to convert optical energy of one optical signal into optical energy of another optical signal. Generally the phenomenon occurs due to a non-linear characteristic of the propagation medium of the fiber, in particular a non-linear variation of refractive index with wavelength. Such a process is also called a third-order nonlinearity. The presence of optical signals having different wavelengths can create one or more other optical signals of yet other wavelengths, and vice-versa. One particular form of nonlinear wave mixing is known as "four-wave mixing" or FWM, and this form is referred to for illustration in the description below.

The nonlinear mixing or "parametric" approach with fibers is very promising for many reasons. It leverages advances in technology (primarily power and beam quality) of already commercialized lasers. It can effect wavelength translation, enabling use of one type of laser to create light at wavelengths that are not susceptible of direct generation, due for example to material limitations such as lack of dopants with necessary properties. Additionally, modulation or other characteristics can be transferred to an output beam from an input beam, meaning for example that conventional telecom-class lasers and modulation apparatus can be employed to create correspondingly modulated beams at other wavelengths such as blue-green.

The physics and operation of wavelength conversion using nonlinear wave mixing in optical fibers is generally well known. In one manifestation, FWM in an optical fiber can take two photons from a degenerate pump and split it into a Stokes (red) photon and an anti-Stokes (blue) photon. This process requires conservation of energy as well as conservation of momentum, conditions expressed as:

$$\Delta\omega = 2\omega_p - \omega_s - \omega_{as} = 0$$

$$\Delta k = 2k_p - k_s - k_{as} = 0$$

where $\omega$ is angular frequency of the wave, k is the wavevector, and the subscripts, p, as, and s stand for the pump, anti-stokes and stokes lines, respectively. Since the spectral curvature of the wavevector, k, is dispersion, the efficiency of the process critically depends on dispersion of modes in a fiber. Specifically, one achieves efficient wavelength conversion for wavelengths at which $\Delta k \sim 0$. This latter condition is often referred to as the "phase matching" condition.

Figure 5:
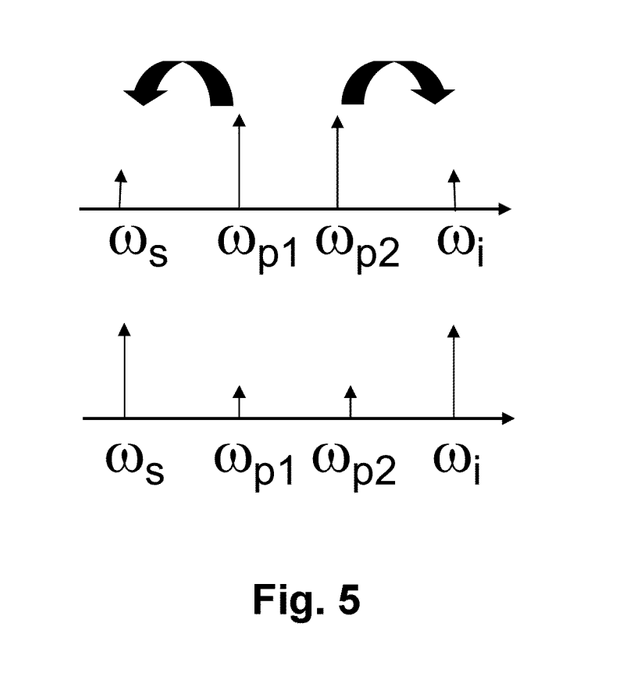
FIG. 5 is a depiction of operation of four-wave mixing.

FIG. 5 illustrates a slightly more general case in which the energy from two spectrally separated pump waves, $\omega_{p1}$ and $\omega_{p2}$, creates two waves $\omega_s$ and $\omega_i$, commonly referred to as "signal" and "idler" respectively. The above-mentioned "degenerate" case is a case in which a signal and idler are created from two separate photons of a single pump wave rather than from separate photons of two distinct pump waves.

Figure 6:
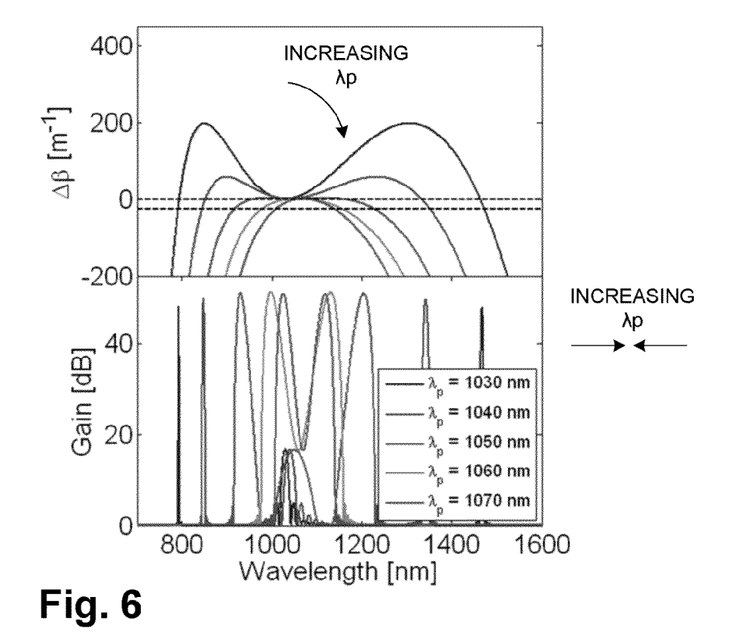
FIGS. 6 and 7 are plots of phase-matching curves for HOM fibers.
Figure 7:
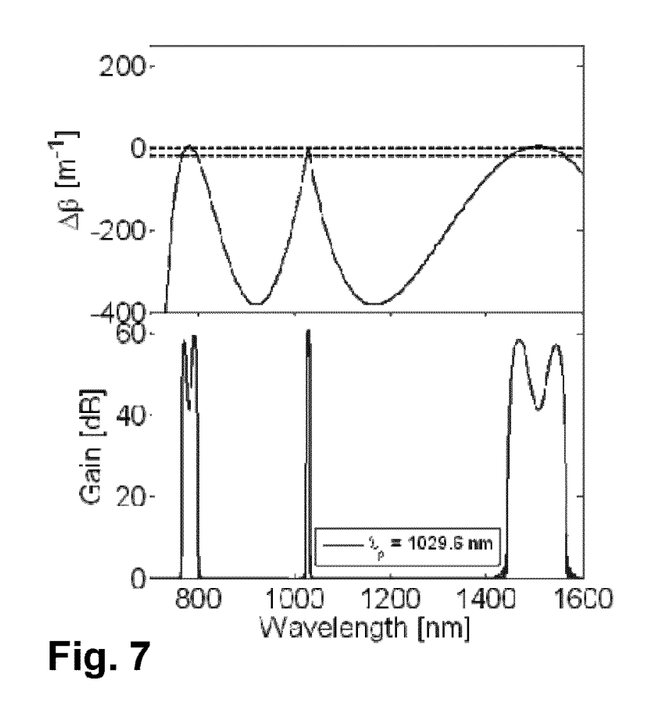

FIGS. 6 and 7 show example phase matching curves for a degenerate pump condition. Dashed lines indicate regions of high gain. Gain spectra are calculated at a given location such as after 1 m of propagation. Insets show the intensity profiles for modes used for the idler (I), pumps (P1/P2), or signal (S), respectively. FIG. 6 shows a "monomode" case in which all interacting waves propagate in the same mode (in this case LP06), having ZDW=1052 nm. The phase curves broaden and flatten as wavelength increases, and in the gain curves the separated peaks become closer and rounder as wavelength increases. FIG. 7 shows an "intermodal" or "multimode" case in which different waves propagate in different modes. In the illustrated example, idler and pump1 are in the LP04 mode, while pump2 and signal are in the LP05 mode.

The gain from the four-wave mixing process in a fiber is highest when the phase mismatch, $\Delta\beta$ between the pump, idler and signal lies within certain gain boundaries which are depicted by dashed lines in FIGS. 6 and 7. For the fiber design of FIG. 6, the LP06 mode has a ZDW at 1052 nm, and pumping this fiber in the LP06 mode at wavelengths around this ZDW value yields gain spectra reminiscent of modulation instability regimes or sharp, narrow FWM regimes in single mode fibers. However, this is occurring with a mode area Aeff of 600 mm$^2$, yielding very high-power amplification of the signal and idler.

One particular advantage of multimode FWM is illustrated by FIG. 7 for the case of the idler and pump1 in the LP04 mode and pump2 and signal in the LP05 mode (referred to herein as the "4455" arrangement). FIG. 7 shows that, when the pumps are degenerate in wavelength (but not in modal order), a broad gain bandwidth is obtained even while preserving large wavelength separation—a feature that is not known to be exhibited in the multitude of specially designed dispersion tailored fibers for FWM applications. The zero gradient for the PMC in the gain region immediately suggests stability against ZDW fluctuations in the fiber, which in turn indicates that this regime would be robust to fiber diameter fluctuations—usually the bane of efficient wavelength conversion via FWM. The 4455 arrangement preserves the central feature of HOMs—its large effective area—enabling high-power wavelength conversion operations. For example, two 45 ns pump pulses with peak powers of 19 kW in the LP04 and LP05 modes, respectively, can yield a 1 mJ pulse at 776.8 nm.

The large mode areas of the participating modes enable operation below the dielectric breakdown threshold while also avoiding efficiency degradation due undesired nonlinearities such as self-phase modulation (SPM) or cross-phase modulation (XPM). Also, an appropriate choice of modes ensures substantially complete phase matching, so that photon-to-photon conversion efficiencies approaching 100% may be obtained for this case.

Figure 8A:
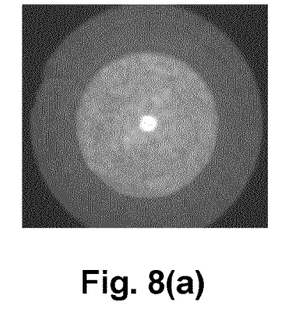
FIG. 8(a) is an image of a cross section of a HOM fiber.
Figure 8B:
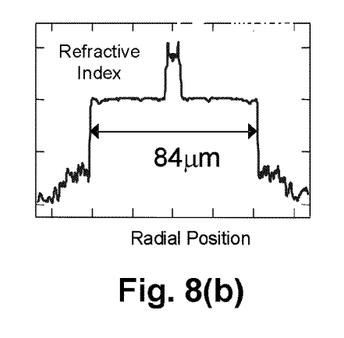
FIG. 8(b) is a plot of index versus radial location in a HOM fiber.
Figure 8C:
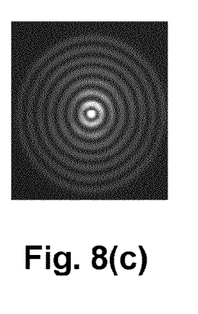
FIG. 8(c) is a cross-sectional image of a light beam propagating in a higher-order mode.

FIGS. 8(a), 8(b) and 8(c) show a mode image, canonical refractive index profile and mode profile of an example HOM fiber. FIG. 8(a) is a transmission-mode microscope image of the fiber facet, clearly delineating three regions in this fiber—a core, an inner cladding and an outer cladding. FIG. 8(b) shows the corresponding refractive index profile. The central high-index core may have an index and dimensions similar to that of SMF for the relevant wavelength of operation. This is surrounded by a large inner cladding region that is 84-μm wide in this fiber, though for different designs, this can extend from 10 μm to 200 μm. Surrounding that is a region of deeply down-doped outer cladding. The core serves to guide incoming light in the conventional Gaussian-shaped fundamental mode (the LP01 mode). An in-fiber grating then efficiently converts this mode into the desired HOM, which is guided in the larger waveguide defined by the inner cladding. An example resultant intensity profile of the signal in the HOM is shown in FIG. 8(c), which is a false-color illustration of a near-field image of an LP08 mode after 50 meters of propagation in the fiber. As an illustrative example, this mode might be generated at 1083 nm and have an Aeff of ~1750 μm$^2$.

Very stable modal propagation can be achieved in HOMs that reside in very large cores (84 μm diameter, in the above case). The waveguide is a very simple design comprising just three layers: the central core that guides the Gaussian beam, the region defined by the central core and the inner cladding guiding the large-mode-area (LMA)-HOM, and an outer low index layer that essentially acts as the confining layer for the HOM.

Figure 9:
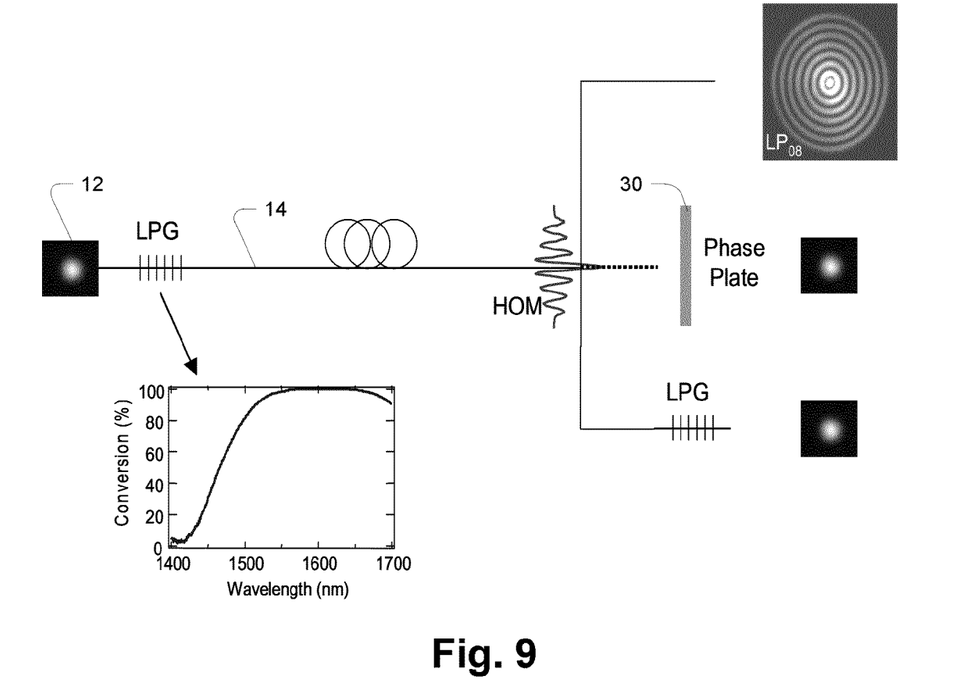
FIGS. 9-12 are schematic diagrams of fiber lasers.

FIG. 9 illustrates in detail, a device arrangement that can be used to generate HOMs as described herein. An incoming LP01 mode from a source 12 is guided by the central core at an input end of a fiber 14. An in-fiber long-period grating (LPG) converts the LP01 mode into the desired higher-order LP0x mode (x is an integer >1). UV-induced LPGs are used to couple light between two co-propagating modes in a fiber. They are known to exhibit back-reflections less than −60 dB and insertion losses <0.1 dB, and the process is very efficient when the grating period is adjusted to match the beat length between two modes. In addition, by engineering the group velocities of different modes in a fiber, this process can be both efficient and broadband. The inset in FIG. 4 shows the conversion efficiency of the LPG used here. Note that >99% coupling efficiency can be achieved over bandwidths as large as 94 nm, and peak efficiencies can be >99.9%. This ensures that a modally pure LMA-HOM is excited in the fiber, resulting in a modally pure output.

At the output of the device, several options exist, depending on the desired application of the high-power laser. Three options are illustrated by three different output branches on the right hand side in FIG. 9. In one case, the HOM may be used as-is, being out-coupled by suitable treatment of the output end of the fiber 14 as generally known in the art. This is illustrated in the topmost of the three branches. As shown, the HOM mode profile is a modally pure beam and actually resembles a Bessel beam. It is well known that Bessel beams are rigorous solutions of the free-space Helmholtz equation, and in fact may be preferred over Gaussian beams in several cases—for instance, they exhibit longer Rayleigh lengths than Gaussian beams and thus diffract slower than do Gaussian beams. Thus, a HOM output from a high power laser may actually be preferred in applications in which long-range free-space propagation of the high-power beam is required.

Alternatively, as shown in the middle branch, a holographic phase plate 30 can be used to convert the HOM back into a Gaussian shape. Holographic phase plates, defined lithographically on a quartz substrate, generally have the flexibility to convert any arbitrary modal shape to another one, provided the mode incident on the phase plate is a pure single mode. Since the fundamental advantage of HOM fibers is to yield a modally pure beam at the fiber output, a phase plate may be an attractive means to perform mode reconversion. This may be preferred, for example, in applications where the powers are so high that any in-fiber reconversion at the output may lead to nonlinear distortions.

Finally, since LPGs are reciprocal devices, an output LPG, similar to the LPG at the input end, may be used to convert the HOM back to the Gaussian-shaped LP01 mode of this fiber (bottom branch of FIG. 9). As an example, the LPGs may be 2.5-10 mm long, and the device can be terminated immediately after the output LPG to minimize signal propagation in the small-area LP01 mode. Depending on the application and the nonlinear distortion of concern, this may be the most stable solution for a device, since all mode transformations occur within the fiber.

Figure 10:
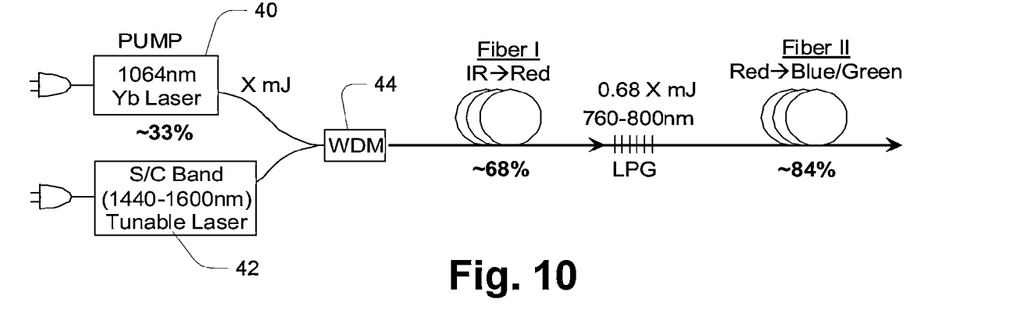
Figure 11:
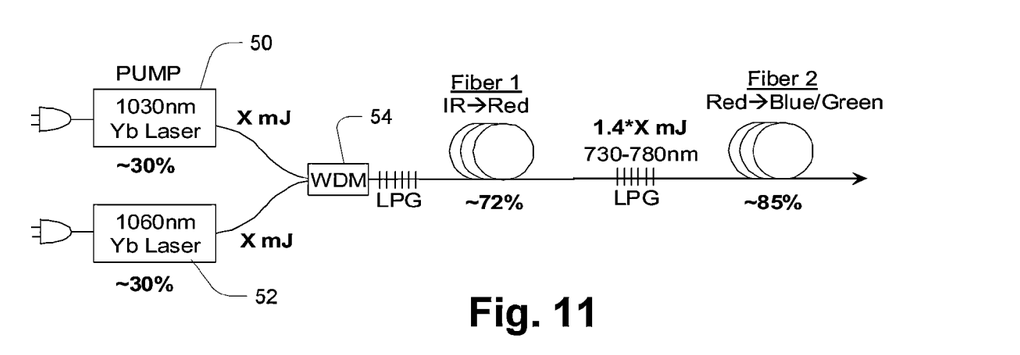
Figure 12:
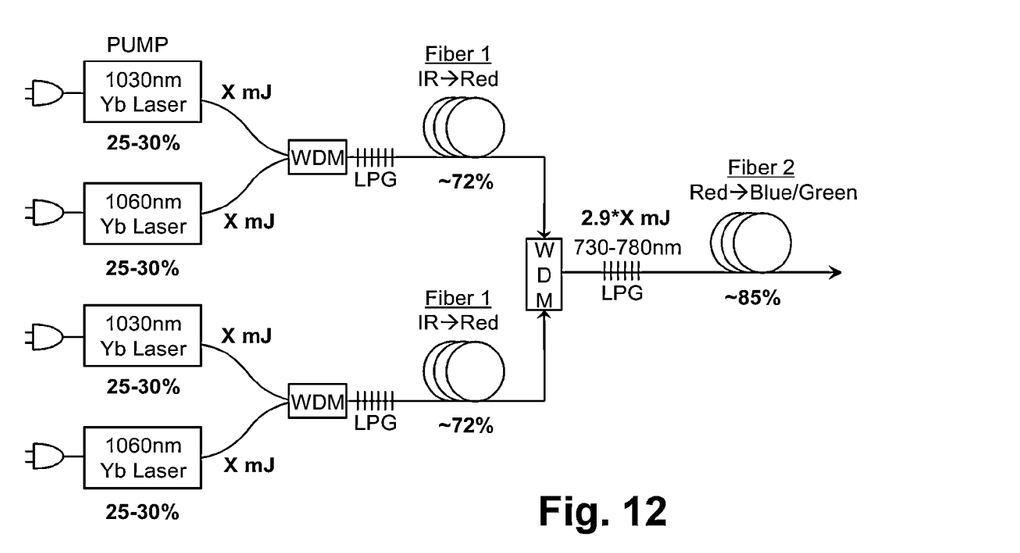

FIGS. 10-12 show example lasers that employ HOM fibers. Important characteristics and aspects of operation of these devices are described further below.

FIG. 10 is a schematic of an example device that uses cascaded fibers of different characteristics to achieve a desired overall wavelength conversion at high power. A commercial Yb:doped fiber laser 40 operating at 103x-106x nm is combined with the low power 1550-nm telecom laser 42 via a wavelength division multiplexer (WDM) 44, and fiber I generates a near-IR photon around 760 nm. The output of fiber I is fed to fiber II, which generates a desired blue-green photon. This configuration enables the creation of an output wave in the blue-green region that carries modulation according to modulation of the telecom laser 42. The percentage values at each point in the schematic refer to efficiency of that specific process. Overall, starting with X mJ of energy from fiber lasers in the 10xx nm range, an output energy of 0.58 X mJ is obtained. This is comparable to the best values from frequency-doubled lasers, but with the additional capability of facilitating high-bandwidth modulation of the output.

FIG. 11 shows another cascaded configuration in which two commercial Yb:doped fiber lasers 50 operating at 103x and 106x nm are combined with a WDM 52, and fiber I generates a near-IR photon around 760 nm. This output is fed to a different fiber II, which generates the desired blue-green photon. The percentage value at each point in the schematic refers to efficiency of that specific process. Overall, starting with X mJ of energy from fiber lasers in the 10xx nm range, output energies of 1.4 X mJ of near-IR photons and 1.2 X mJ of blue/green photons are obtained. In comparison, the conventional approach of using a powerful 10xx nm fiber laser and frequency-doubling its output yields only ~0.5-0.6 X.

FIG. 12 illustrates an alternative embodiment providing coherent combination of four 10xx nm lasers 60 to yield a high-power output in the blue-green spectral range. The outputs of commercially available 10xx nm lasers are multiplexed in a tree architecture into two fibers of type I, whose near-IR outputs are multiplexed together in a type II fiber to generate the blue-green output. This represents a potentially revolutionary means to scale power, yielding 2.5x more power known Yb fiber lasers, at an output wavelength for which no efficient fiber laser dopant exists.

The device architectures of FIG. 10-12 employ 10xx nm fiber laser technology that is well developed and continually improving due to engineering enhancements related to thermal and nonlinear management. Thus, the power of the blue-green output of such devices directly scales with the power of commercial 1060-nm fiber lasers. The architecture provides for both coherent beam combination, of necessity to scaling power, and compactness and robustness of an all-fiber device. It is believed that the device architecture can be scaled at every juncture at which nonlinear intermodal conversion is employed, thus allowing for high levels of power scaling.

Figure 13:
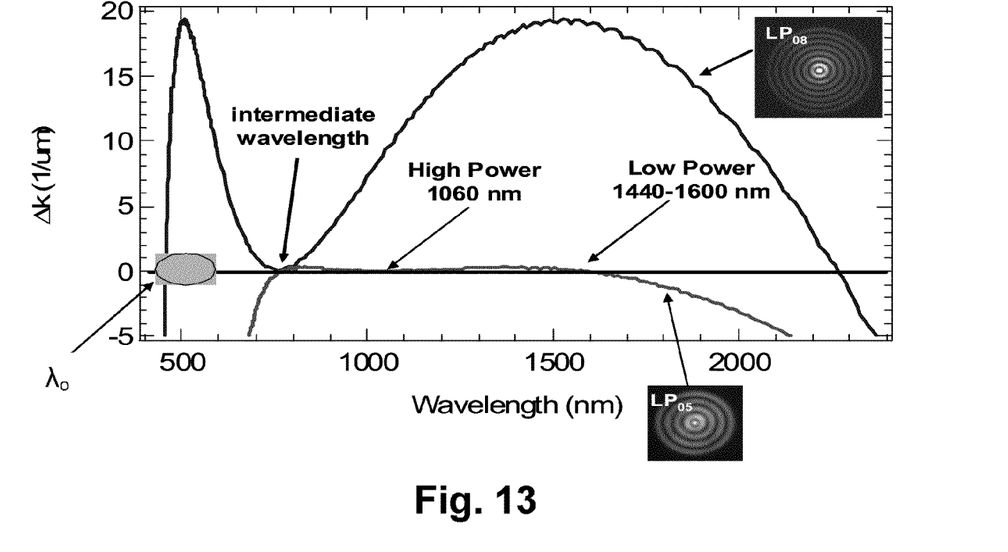
FIGS. 13-14 are plots of phase matching curves for HOM fibers.

FIG. 13 shows the phase matching calculation ($\Delta k$ vs. wavelength curves) for the two fibers I and II of FIGS. 10-12, with the lower curve being that for fiber I and the upper curve being that for fiber II. Efficient FWM demands that $\Delta k=0$. HOM fiber I achieves this in the near-IR (~760 nm) as well as the 1550 nm range, when pumped with a ~1060 nm fiber laser. Thus, the exact spectral position of the ~760 nm photons will be defined by the 1550 nm range. Importantly, if a conventional (low power) telecom laser 42 is used in the 1550 nm region, all its characteristics, such as temporal phase, amplitude, etc., will be superimposed on to the ~760 nm emission. More precisely, the phase of the 760 nm light will be the conjugate of the phase of the 1550 nm emission, but this has no influence in an amplitude modulated scheme). In other words, the ~760 nm emission will acquire the temporal characteristics of the output of the telecom laser 42, along with the power of the output of the 1060 nm laser 40. Since FWM is a photon-to-photon conversion process, most of the energy is transferred to the photon generated at the lower wavelength. Moreover, simulations indicate 100% photon conversion for the correct set of group velocity and dispersion values. Thus, most of the energy will be transferred from the 1060-nm laser to emission in the ~760 nm spectral range.

The process is repeated for the second fiber (fiber II), which takes the near-IR output of the fiber I (lower curve) and generates an output signal $\lambda_0$ in the blue-green spectral range (455-510 nm). For this second process, there is only one pump signal playing a role—the ~760 nm emission created from fiber I. Therefore, the emission in the blue-green spectral range has the temporal characteristics of the 1550-nm telecom laser 42 but the power of the 1060-nm Yb:fiber laser 40. The range of wavelengths shown in the blue-green spectrum that can be achieved with this process illustrates the fact that choice of mode order or slight variations in fiber design allow achieving a vast range of sources for the different Jerlov conditions that may be required in an application.

Figure 14:
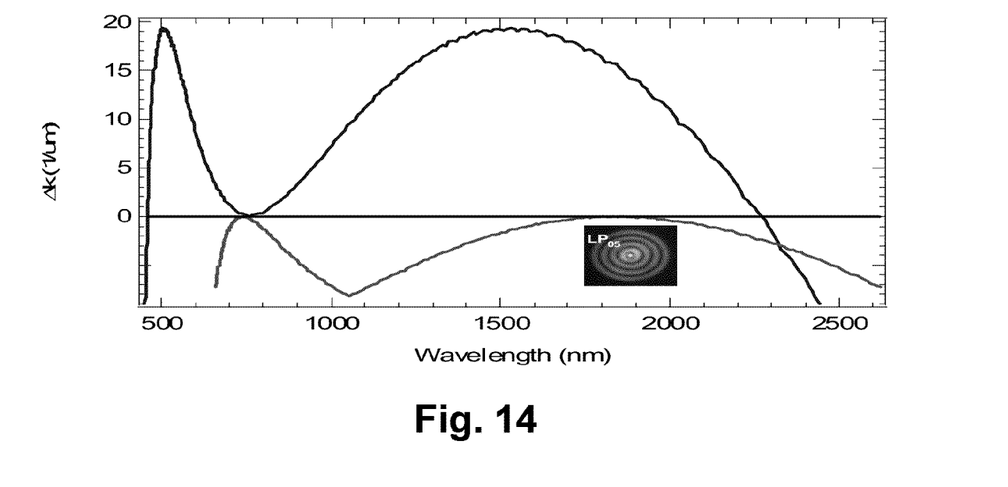

FIG. 14 shows the phase matching calculation ($\Delta k$ vs. wavelength curves) for two fibers with profiles similar to those above but under different pump conditions. In this case, HOM fiber I achieves emission in the near-IR (~750 nm) as well as the 1800-1900 nm range. Since FWM is a photon-to-photon conversion process, most of the energy is transferred to the photon generated at the lower wavelength. This process converts the energy of two pump photons that are spectrally separated. Thus, this process serves to take two pump photons at different wavelengths, which can easily be combined with a WDM, and generate coherent stokes and anti-stokes photons. Note that this is a novel means of coherent power combination from two separate lasers. Thus, this provides for a powerful new way to scale power, in addition to the use of large Aeff. This is possible because HOMs offer several phase matching possibilities, thus achieving $\Delta k=0$ even with two spectrally separated pumps. Following this, another similar fiber (fiber II) takes the near-IR output of fiber I (lower curve) and generates photons in the blue-green spectral range.

In brief summary, the following are particular characteristics and advantages of the disclosed techniques:

(1) Pulse Energy Scaling: It is believed that the proposed HOM fibers can achieve up to 10 kW of peak power (Ppeak) in the blue-green spectral range. This can be achieved using a cascaded architecture in which the characteristics of a 1550-nm laser are transferred to an intermediate wavelength range of ~760 nm with a first HOM fiber I, and then repeating the operation with the output of fiber I, in a second HOM fiber II, to transfer the power to the blue-green spectral range.

(2) Modulation: It is feasible to transfer the complex modulation of one laser, such as a conventional 1550-nm telecom laser, to an entirely different spectral range such as the blue-green.

(3) Efficiency: A particularly attractive feature of using nonlinear wave mixing such as FWM to produce deeply blue light is that the efficiency of the process naturally favors it. The FWM process splits one photon of the pump each, into one photon for the stokes and one for the anti-stokes, respectively. Since the energy carried by the shorter wavelength is higher, the anti-stokes (blue) line always ends up with a substantial fraction of the pump energy. For example, respective efficiency values of the two stages may be 68% for Fiber I and 84% for fiber I. Overall wall-plug efficiency is governed by that of commercial Yb-doped fiber lasers operating at 10xx nm. For the current typical values of ~33%, this translates to an overall wall-plug efficiency of ~17%.

While various embodiments of the invention have been particularly shown and described, it will be understood by those skilled in the art that various changes in form and details may be made therein without departing from the spirit and scope of the invention as defined by the appended claims.

What is claimed is:
1. A fiber laser, comprising:
a higher-order-mode (HOM) fiber, the HOM fiber supporting a plurality of guided modes of propagation including higher-order modes, the HOM fiber having a predetermined mode-dependent dispersion characteristic defining a zero-dispersion wavelength for a first higher-order mode, the zero-dispersion wavelength defining a set of respective higher-order modes, wavelengths and phases of constituent optical signals of a predetermined pattern of nonlinear wave mixing in which at least one of the constituent optical signals propagates in the first higher-order mode,
an optical signal source having an output coupled to an input point of the HOM fiber and operative to launch a first optical signal into the HOM fiber, the first optical signal being a first one of the constituent optical signals and producing the predetermined pattern of nonlinear wave mixing in the HOM fiber; and
an output optical element coupled to an output point of the HOM fiber, the output optical element operative to extract a second optical signal from the HOM fiber, the second optical signal being a second one of the constituent optical signals and produced by the pattern of nonlinear wave mixing, the second optical signal propagating in a second higher-order mode of the set of modes defined by the zero-dispersion wavelength.

2. A fiber laser according to claim 1, wherein the HOM fiber exhibits substantially uniform effective cross sectional areas for respective ones of the higher-order modes.

3. A fiber laser according to claim 2, wherein the cross sectional areas are in a range of 100 square micrometers to 10,000 square micrometers.

4. A fiber laser according to claim 1, wherein the pattern of nonlinear wave mixing includes mixing of optical signals propagating in different ones of the higher-order modes.

5. A fiber laser according to claim 4, wherein two of the optical signal are two distinct pump optical signals having the same wavelength and propagating in the different higher-order modes, and the nonlinear wave mixing effects a coherent combining of powers of the two distinct pump signals.

6. A fiber laser according to claim 1, wherein the nonlinear wave mixing is four-wave mixing arising from third-order nonlinearity in the HOM fiber.

7. A fiber laser according to claim 1, wherein all the optical signals of the pattern of nonlinear wave mixing propagate in a same one of the higher-order modes.

8. A fiber laser according to claim 1, wherein the first optical signal is a pump wave and the second optical signal is a signal wave.

9. A fiber laser according to claim 8, wherein the pump wave has a wavelength within 50 nm of the zero-dispersion wavelength.

10. A fiber laser according to claim 9, wherein the pump wave is a degenerate wave separable into first and second components, energy of a first component being transferred to the signal wave and energy of a second component being transferred to an idler wave of the pattern of nonlinear wave mixing.

11. A fiber laser according to claim 8, wherein the pump wave is a first pump wave, and further including an additional optical signal source having an output coupled to the input point of the HOM fiber and operative to launch a third optical signal into the HOM fiber, the third optical signal being second pump wave and third one of the constituent optical signals, and wherein respective energies of the first and second pump waves are transferred to both the signal wave and to an idler wave of the pattern of nonlinear wave mixing.

12. A fiber laser according to claim 1, wherein the first optical signal is a signal wave and the second optical signal is a pump wave, and further including an additional optical signal source having an output coupled to the input point of the HOM fiber and operative to launch a third optical signal into the HOM fiber, the third optical signal being an idler wave and a third one of the constituent optical signals, and wherein respective energies of the signal and idler waves are both transferred to the pump wave.

13. A fiber laser according to claim 12, wherein the signal wave has a wavelength within 50 nm of the zero-dispersion wavelength.

14. A fiber laser according to claim 12, wherein the pump wave is a degenerate wave separable into first and second components, energy of a first component being transferred from the signal wave and energy of a second component being transferred from the idler wave.

15. A fiber laser according to claim 1, wherein the optical signal source includes:
   a source of a zeroth-order optical signal; and
   a mode converter operative to convert the zeroth-order optical signal into the first optical signal propagating in its respective higher-order mode.

16. A fiber laser according to claim 15, wherein the mode converter includes a linear periodic grating formed at the input point of the HOM fiber.

17. A fiber laser according to claim 15, wherein the zeroth-order optical signal is an input zeroth-order optical signal and the mode converter is an input mode converter, and wherein the output element includes an output mode converter operative to convert the second optical signal propagating in the second higher-order mode to an output zeroth-order optical signal emitted by the fiber laser.

18. A fiber laser according to claim 1, wherein the HOM fiber is a first HOM fiber and the output element emits an intermediate optical signal generated from the second optical signal, and further including a second HOM fiber receiving the intermediate optical signal and generating a different-wavelength output optical signal, the second HOM fiber having a second predetermined mode-dependent dispersion characteristic defining a second zero-dispersion wavelength for a third higher-order mode, the second zero-dispersion wavelength defining a second set of respective higher-order modes, wavelengths and phases of constituent optical signals of a second predetermined pattern of nonlinear wave mixing in which at least one of the constituent optical signals propagates in the third higher-order mode, the output optical signal being one of the constituent optical signals of the second predetermined pattern of nonlinear wave mixing.

19. A fiber laser according to claim 18, wherein the output optical signal has a wavelength substantially shorter than a wavelength of the intermediate optical signal.

20. A method of producing an optical signal, comprising:
   launching a first optical signal into a higher-order-mode (HOM) fiber, the HOM fiber supporting a plurality of guided modes of propagation including higher-order modes, the HOM fiber having a predetermined mode-dependent dispersion characteristic defining a zero-dispersion wavelength for a first higher-order mode, the zero-dispersion wavelength defining a set of respective modes, wavelengths and phases of constituent optical signals of a predetermined pattern of nonlinear wave mixing in which at least one of the constituent optical signals propagates in the first higher-order mode, the first optical signal having a first wavelength of the set of wavelengths and producing the predetermined pattern of nonlinear wave mixing in the HOM fiber; and
   extracting a second optical signal from the HOM fiber, the second optical signal produced by the pattern of nonlinear wave mixing and having a second wavelength of the set of wavelengths, the second optical signal propagating in a second higher-order mode of the set of modes defined by the zero-dispersion wavelength.

* * * * *